Patented Feb. 6, 1934

1,946,058

UNITED STATES PATENT OFFICE 1,946,058

AMINO-AROMATIC KETONES AND METHOD OF MAKING SAME

Edgar C. Britton, Midland, Mich., and Fred Bryner, Oakland, Calif., assignors to The Dow Chemical Company, Midland, Mich., a corporation of Michigan No Drawing. Application July 27, 1932
Serial No. 625,192

8 Claims. (Cl. 260—64)

The present invention relates to a new method of making amino-aromatic ketones having the general formula

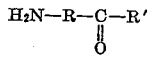

wherein R represents an aromatic residue of the benzene or naphthalene series and R' represents an alkyl residue or an aromatic residue of the benzene or naphthalene series.

The reaction of ammonia or a primary amine with an aromatic ketone such as acetophenone or benzophenone, under substantially anhydrous conditions or in alcoholic solution, to form an imide of the ketone is well known and has long been considered the reaction which may be expected to take place when such reactants are heated together, particularly when heated together in the presence of certain catalysts. Grabe and Kellar, Ber. 32, 1687, have prepared the phenylimide of ortho-chloro-benzophenone, having the formula

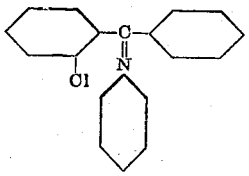

by heating a mixture consisting of equal parts of ortho-chloro-benzophenone and aniline to about 200° C. for a period of between 3 and 4 hours. Insofar as we are aware no work concerning the action of halogenated aromatic ketones with aqueous ammonia has ever been published, but from the above known reactions, particularly that of Grabe and Kellar, it would be expected that a halogenated aromatic ketone would react with aqueous ammonia to form the imide of said halogenated ketone. Thus, reaction of 4-chloro-benzophenone with aqueous ammonia would be expected to yield an imide having the formula

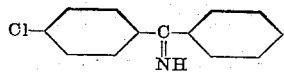

as principal product.

In contrast to such expected result, we have found that a halogenated aromatic ketone, having the general formula

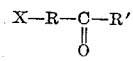

wherein X represents halogen, R represents an aromatic residue of the benzene or naphthalene series, and R' represents an alkyl residue or aromatic residue of the benzene or naphthalene series, may be reacted with aqueous ammonia, in the presence of a copper compound as a catalyst, to form an amino-aromatic ketone, having the general formula

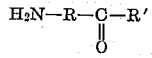

Such reaction is carried out under superatmospheric pressure and usually at a temperature between about 170° and 300° C., although temperatures outside such range may sometimes be employed. The reaction proceeds smoothly and the desired amino-ketone product is obtained in especially high yield when a halogenated aromatic ketone, having the general formula

is reacted with aqueous ammonia under the general reaction conditions set forth above. Our invention, then, consists of the new method of making amino-aromatic ketones hereinafter fully described and particularly pointed out in the claims.

The following examples set forth in detail several of the various ways in which the principle of our invention may be employed. It is to be understood, however, that said examples are purely illustrative and are not to be construed as a limitation on the invention.

Example 1

A mixture consisting of 63 grams (0.408 mole) of para-chloro-acetophenone, 123.8 grams (2.0 moles) of 28 per cent aqueous ammonia solution, and 7 grams (0.049 mole) of cuprous oxide, was heated to and maintained at approximately 220° C. in a rotating iron bomb, for a period of 5 hours. The bomb was cooled, the charge removed therefrom, and the aqueous mixture was then filtered to separate the reaction product as a solid residue. An aliquot portion of the filtrate was analyzed for inorganic chloride, it being found that 91 per cent of the chlorine present in the para-chloro-acetophenone used had been converted to inorganic chloride during reaction. The solid residue from the above mentioned filtration was steam distilled to remove unreacted para-chloro-acetophenone therefrom. The residual aqueous mixture was treated with Norite (a decolorizing charcoal), then filtered while hot. Substantially pure para-amino-acetophenone was crystallized from the filtrate by cooling the latter to about 15° C. The yield of dried product was 37.5 grams, i. e., 68 per cent of theoretical, based on the quantity of para-chloro-acetophenone used, or 74.8 per cent of theoretical, based on the quantity of para-chloro-acetophenone reacted.

*Example 2*

A mixture consisting of 68 grams (0.314 mole) of para-chloro-benzophenone, 113.5 grams (1.87 moles) of 28 per cent aqueous ammonia solution, and 5.4 grams (0.038 mole) of cuprous oxide was heated in an iron bomb at 220° C. for a period of 8 hours. The bomb was then cooled and the charge removed therefrom. The product was separated from the reaction mixture and purified through procedure similar to that described in Example 1. There was obtained 49 grams (0.249 mole) of substantially pure para-amino-benzophenone, the yield thereof being about 79 per cent of theoretical, based on the quantity of para-chloro-benzophenone employed.

*Example 3*

Para-para'-diamino-benzophenone was prepared by heating a mixture consisting of 53.1 grams (0.211 mole) of para-para'-dichloro-benzophenone, 134.3 grams (2.21 moles) of 28 per cent aqueous ammonia solution, and 7.6 grams (0.053 mole) of cuprous oxide, in a rotating iron bomb at approximately 220° C. during a period of 8 hours. The bomb was then cooled and the charge removed therefrom. The product was separated and purified through procedure similar to that described in Example 1. In order to assure complete purity of the product, it was recrystallized from acetone. There was obtained 32.5 grams (0.153 mole) of para-para'-diamino-benzophenone melting at approximately 242.5° C., the yield being about 72.5 per cent of theoretical, based on the quantity of para-para'-dichloro-benzophenone used. The crystalline product was light yellow in color.

The principle of our invention may be employed in ways other than those specifically set forth in the examples. We may, for instance, react any nuclear halogenated aromatic ketone of the benzene or naphthalene series (e. g. para-bromo-acetophenone, 3-methyl-4-chloro-benzophenone, 3-ethyl-4-bromo-acetophenone, 4.4'-dichloro-1.1'-dinaphthyl ketone, 4-bromophenyl-naphthyl ketone, 2-bromo-benzophenone, 4-chlorophenyl-ethyl ketone, etc.) with aqueous ammonia under the conditions herein described to form the corresponding amino-aromatic ketone. The reaction proceeds most smoothly and the reaction product is most readily separated in pure form, however, when an aromatic ketone having a halogen substituent in the para-position of a benzene nucleus, e. g. para-bromo-acetophenone, para-iodo-benzophenone, naphthyl-4-chlorophenyl ketone, etc., is employed as the halogenated aromatic ketone reactant. A preferred use of our invention, then, comprises reacting aqueous ammonia with a halogenated aromatic ketone, having the general formula

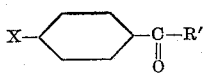

wherein X represents halogen and R' represents an alkyl residue or aromatic residue of the benzene or naphthalene series, and wherein the aromatic residues may be further substituted by alkyl substituents, to form the corresponding amino-aromatic ketone.

While each of the reactions described in the examples was carried out at approximately 220° C., such reactions may be carried out at any temperature between about 170° and 300° C. The reaction proceeds most smoothly, however, at a temperature between about 190° and 250° C.

In place of cuprous oxide, employed as a catalyst in each of the examples, other compounds of copper (e. g. cupric oxide, cuprous chloride, cupric sulphate, etc.) may be employed to catalyze such reactions. The exact quantity of catalyst present in the reaction mixture is of secondary importance. We find it convenient, however, to employ between about 0.02 and 0.20 mole of catalyst per mole of halogenated aromatic ketone in carrying out a reaction between aqueous ammonia and such ketone according to the present method.

The reaction of a halogenated aromatic ketone with ammonia, according to the present method, is carried out in the presence of water. The quantity of water necessary for smooth reaction may, however, be varied between wide limits. It may be either more or less than the quantity of water required to hold all of the ammonia in solution at room temperature under atmospheric pressure. In general, however, we find it most convenient to employ a 25 to 30 per cent aqueous ammonia solution.

Each experiment described in the examples was carried out on laboratory scale. When operating on laboratory scale, the aqueous liquor from which the reaction product is crystallized is ordinarily discarded. Crystallization of an amino-aromatic ketone is seldom complete, hence a portion of the product is lost with the discarded liquor. The yields set forth in the examples do not, then, represent maximum yields obtainable under the reaction conditions described. During the commercial production of an amino-aromatic ketone according to the present method, the aqueous mother liquor, from which a desired product is crystallized, is re-employed in the initial reaction as the aqueous medium therein, hence any product which may remain dissolved in such mother liquor is recycled through the reaction, thereby increasing the yield of product above the yield ordinarily obtainable when operating on laboratory scale.

The present invention, in brief, comprises reacting aqueous ammonia with a nuclear halogenated aromatic ketone in the presence of a copper compound as a catalyst to form the corresponding amino-aromatic ketone through displacement of the halogen substituent of the ketone reactant.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making an amino derivative of an aromatic ketone which comprises reacting a nuclear halogenated aromatic ketone of the benzene or naphthalene series with aqueous ammonia under superatmospheric pressure at a temperature between about 170° and about 300° C. and in the presence of a copper compound.

2. The method of making an amino derivative of an aromatic ketone which comprises reacting a halogenated aromatic ketone having the general formula

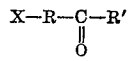

wherein X represents a halogen, R represents an aromatic radical of the benzene or naphthalene series, and R' represents a radical selected from the class consisting of alkyl radicals and aromatic radicals of the benzene and naphthalene series, and wherein the various aromatic radicles may bear alkyl substituents, with aqueous ammonia under superatmospheric pressure at a temperature between about 170° and about 300° C. and in the presence of a copper compound as a catalyst.

3. In a method of making an amino derivative of an aromatic ketone, the step which consists in reacting a halogenated aromatic ketone, having the general formula

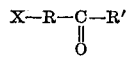

wherein X represents a halogen, R represents an aromatic radical of the benzene or naphthalene series and R' represents a radical selected from the class consisting of alkyl radicals and aromatic radicals of the benzene and naphthalene series, with at least twice its molecular equivalent of aqeuous ammonia under superatmospheric pressure at a temperature between about 190° and about 250° C. and in the presence of a cuprous compound as a catalyst.

4. In a method of making an amino derivative of an aromatic ketone, the step which consists in reacting a halogenated aromatic ketone, having the general formula

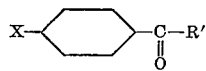

wherein X represents a halogen and R' represents a radical selected from the class consisting of alkyl radicals and aromatic radicles of the benzene and naphthalene series, and wherein the various aromatic radicals may be further substituted by alkyl substituents, with a concentrated aqueous ammonia solution, the reaction being carried out under superatmospheric pressure, at a temperature between about 170° and about 300° C. and in the presence of a copper compound as a catalyst.

5. In a method of making an amino derivative of an aromatic ketone, the step which consists in reacting a halogenated aromatic ketone, having the general formula

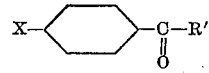

wherein X represents a halogen and R' represents a radical selected from the class consisting of alkyl radicals and aromatic radicals of the benzene and naphthalene series, with at least twice its molecular equivalent of a between 25 and 30 per cent aqueous ammonia solution, the reaction being carried out under superatmospheric pressure at a temperature between about 190° and about 250° C. and in the presence of a cuprous compound as a catalyst.

6. In a method of making para-amino-acetophenone, the step which consists in reacting para-chloro-acetophenone with at least twice its molecular equivalent of a between 25 and 30 per cent aqueous ammonia solution under superatmospheric pressure, at a temperature between about 190° and about 250° C., and in the presence of a cuprous compound as a catalyst.

7. In a method of making para-amino-benzophenone, the step which consists in reacting para-chloro-benzophenone with at least twice its molecular equivalent of a between 25 and 30 per cent aqueous ammonia solution under superatmospheric pressure, at a temperature between about 190° and about 250° C., and in the presence of a cuprous compound as a catalyst.

8. In a method of making para-para'-diaminobenzophenone, the step which consists in reacting para-para'-dichloro-benzophenone with at least twice its molecular equivalent of a between 25 and 30 per cent aqueous ammonia solution under superatmospheric pressure, at a temperature between about 190° and about 250° C., and in the presence of a cuprous compound as a catalyst.

EDGAR C. BRITTON.
FRED BRYNER.